United States Patent [19]
Filipov

[11] Patent Number: 5,931,325
[45] Date of Patent: Aug. 3, 1999

[54] ADJUSTABLE MUDRING FOR CONVENTIONAL ELECTRICAL OUTLET BOX

[76] Inventor: Stefan Dimitrov Filipov, 5841 N. Maplewood Ave., Chicago, Ill. 60659

[21] Appl. No.: 09/028,864
[22] Filed: Feb. 20, 1998
[51] Int. Cl.[6] .................................................. H02G 3/08
[52] U.S. Cl. ............................................. 220/3.7; 174/57
[58] Field of Search ..................................... 220/3.7, 3.92, 220/3.9, 3.94; 174/57

[56] References Cited

U.S. PATENT DOCUMENTS

| | | | |
|---|---|---|---|
| 3,189,077 | 6/1965 | Willis, Jr. et al. | 220/3.7 X |
| 4,634,015 | 1/1987 | Taylor | 220/3.7 |
| 4,794,207 | 12/1988 | Norberg et al. | 220/3.3 X |
| 5,042,673 | 8/1991 | McShane | 220/3.7 |

Primary Examiner—Steven Pollard

[57] ABSTRACT

The present ADJUSTABLE MUDRING FOR CONVENTIONAL ELECTRICAL BOX is intended to replace the conventional non adjustable mudring in order to enable the electrician to meet the requirements of the electrical code, to provide secure electrical system and to make the work easier and faster. The present adjustable mudring includes mounting plate which is basically similar to the mounting plate of conventional mudring, includes collar open to the front and rear, having a treaded openings at the corners to receive the adjustment screws. Also having movable frame which can be adjusted flash with the surface of the wall and secured in that position and adjustment screws. By rotating the adjustment screws the frame can be moved outward, inward, tilted, twisted, no mater how the electrical junction box is installed in the wall.

5 Claims, 4 Drawing Sheets

5,931,325

ADJUSTABLE MUDRING FOR CONVENTIONAL ELECTRICAL OUTLET BOX

BACKGROUND OF THE INVENTION

The present invention relates in general to a mudring which may be attached to a conventional electrical junction box, and in particular to adjustable mudring which may be attached to conventional electrical junction box to enable positioning the front of the mudring at selectable distance from the junction box. More specifically the present invention relates to a adjustable mudring used to enable the positioning of the front of the mudring flush with the surface of the wall regardless of the relative position of the junction box in relation to the wall.

Because of various state and federal codes, the wiring of a building requires the use of metal conduit for holding electrical wires, and so-called electrical junction boxes on which may be mounted a variety of electrical devices for access by the user of the building. Such junction boxes are mounted within the walls of the building, with openings provided in the walls for access to the junction boxes. These openings are usually smaller then the junction box itself. Mudring of a different size is attached to the junction box. The junction box remains concealed behind the sheathing of the wall (drywall, plaster). Replacement of the junction box or the mudring attached to the junction box is impossible without disturbing the wall finish and sheathing. The mudring has depth equal to the thickness of the sheathing and extends true the opening in the wall. It is desirable that the open front of the mudring is positioned adjacent to the surface of the wall so that when a switch or plug is mounted in the junction box, the front of the switch or plug will be substantially flush with the surface of the wall. Another reason of exact positioning of the junction box is that some state end local codes require minimum distance from the face of the mudring to the wall plate covering the outlet (switch). However because of the wide variety of types of walls in which the conduit and electrical junction boxes are installed, and because the junction boxes are typically installed before the wall surfaces are applied to studs or to like, it is difficult to estimate the proper location of the junction box to ensure that the front of the switch or plug will be flush with the wall surface. Sometimes the junction boxes are not installed at the right position according to the wall sheathing (at different angle) which is an additional problem for the proper installation of the outlet or switch. If the mudring protrudes out from the wall surface, then the switch or plug will appear unsightly, whereas if the junction box is recessed too far from the wall surface, than the switch or plug to be mounted therein may not be adequately protected from spark or other electrical hazards reaching surrounding combustible materials. In many cases when the junction box is installed to deep into the wall the switch or outlet does not have support on the surface of the wall and the switch or outlet is going to deep into the wall that the wall plate can not cover it or the screws connecting the switch (outlet) to the mudring have to be left loose and then a good ground between the switch or outlet and the junction box is missing. Furthermore, if the junction box is too far, recessed from the wall surface, it may, not even be possible to mount the switch or plug therein.

In many cases during the construction or after the construction is completed, the user of the building decides to change the finished surface of the wall by installing a ceramic tiles or paneling, or the user of the building is planing to have a paneling in the future but at this moment he wants to stay with plain walls. In this case an adequate for the present moment mudring is installed. In the future in order a new wall surface to be installed the already finished wall has to be cut for installation of a new, deeper mudring and the surface of the wall patched again.

A number of adjustable electrical outlet boxes have been proposed to allow mounting a switch or plug so that it is substantially flush with a wall surface. Among these are those disclosed in U.S. Pat. Nos. 707,247 1,975,101 2,048,611 3,433,886 5,289,934 5,098,046 5,114,105 5,253,831 and 4,634,015. Most of these arrangements show combination specialized junction box and slidable element for holding a switch or plug and as such require installation of the specialized junction box everywhere the device is to be used. That is, the device cannot be used with conventional junction boxes and so if the device is going to be used it must be installed at the beginning. This may result in an unnecessary expense since a conventional junction box might have been just as suitable, but such determination is often difficult before the building is constructed. Also, some of the disclosed arrangements allow for adjustment screws or other implements to protrude into the space occupied by electrical wiring which, of course, could be dangerous.

Other invention such as U.S. Pat. No. 4,634,015 partially solves these problems but it is vary difficult to manufacture the collar and the frame to fit exactly in slidable contact and to insure permanent ground. Because of corrosion between the two sliding surfaces the electrical contact is lost, This problem is solved with the present invention because the bolts used for adjustment are used at the same time for tightening the collar to the frame. By that the electrical contact is guaranteed at all times.

Another problem with U.S. Pat. No. 4,634,015 is that for adjusting the collar to the frame a very complicated construction is used It requires special bolts and washers. This construction makes that adjustable outlet box difficult for manufacturing and for assembling and more expensive. This problem doesn't exist with present invention because of shelf bolts are used and the construction of the collar and the frame permits easy manufacturing and wide allowance for assembly.

The proposed junction box in U.S. Pat. No. 4,634,015 is adjustable in some limits and the frame can not be replaced with deeper one after the construction of the wall is completed. The present adjustable mudring permits replacement of one frame with another at any time and by that covers unlimited distance of adjustment.

Another advantage is that this invention permits movement of the frame not only outward and inward but rotation around any axle parallel to the lip of the collar. By that the edge of the adjustable mudring can be adjusted perfectly parallel to the surface of the wall no matter how the junction box is installed.

SUMMARY OF THE INVENTION

It is an object of the present invention to provide an adjustable electrical mudring attachment which may be mounted on a conventional electrical junction box and in which may be installed a conventional electrical switch or plug.

It is another object of the invention to provide such an attachment which may be installed, or replaced with different size one, after the construction is finished.

It is an additional object of the invention to provide such an attachment in which permanent electrical ground is maintained at all the time between the two sliding parts of the adjustable mudring.

It is a further object of the present invention to provide such an attachment wherein the disposition of the outlet box relative to the junction box may be manually adjusted by increasing or decreasing of the distance between the edge of the junction box and the front edge of the mudring and by rotating the mudring relative to the surface of the junction box around any axle parallel to the surface of the junction box so that the front edge of the outlet box can be positioned exactly flush and parallel to the wall surface in which the junction box is installed.

It is a further object of the present invention to permit the mudring to be secured in any position and act as an one hole peace with the junction box.

It is also an object of the invention to provide such an attachment wherein no fasteners or other implements project into the junction box.

It is also an object of the invention to use only standard, readily available bolts which enables the installer to use bolts on hand.

It is also an object of the invention to simplify the way of manufacturing and the use of the invention.

The above and other objects of the invention are realized in a specific illustrative embodiment thereof which includes a mounting plate having a large central opening and a plurality of smaller openings spaced about the central opening. The smaller openings being positioned to coincide with the threaded openings found on the perimeter of a conventional electrical junction box. Also included is a collar open at the front and rear ends and mounted on the mounting plate about the central opening with the side walls projecting outwardly from the plate a predetermined distance to define a front lip. A box frame includes side walls formed to be generally parallel but not necessary in contact with the side walls of the collar, as other invention calls for, in order to provide electrical ground (U.S. Pat. No. 4,634,015 line 36–39 of Summary of the invention). Four adjustment screws are mounted on the box frame so that two of them placed diagonally are supporting the collar from below and the other two screws on the other diagonal are passing through the years of the collar and are holding the collar from above. By loosening the lower bolts and tightening the upper bolts the collar is moved inward and by loosening the upper bolts and tightening the lower bolts the collar is moved outward. By loosening the one of the lower bolts at one of the sides and tightening the upper bolt at the same side the collar is tilted to that side of the junction box. By tightening both upper and lower bolts the collar is secured in position and permanent electrical ground is guaranteed.

A variety of collar heights may be used with the structure which, together with adjustable box frame feature, serves to accommodate a variety of needs for positioning and mounting electrical outlet boxes in a building. Thus, regardless of the placement of the junction box in a building wall, the mudring can be mounted thereon so that the front face thereof is still flush and parallel with wall surface. The mudring can be extended, if necessary, to project trough newly installed wall finishes such as paneling or ceramic tiles. If it is necessary the frame can be removed from the collar and replaced with another one, bigger or smaller, without damaging the finished wall, by removing the upper bolts, removing the frame, removing the lower bolts, replacing the lower bolts with longer (shorter) ones, replacing the frame with bigger (smaller) one and replacing the upper bolts with longer (shorter) ones.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
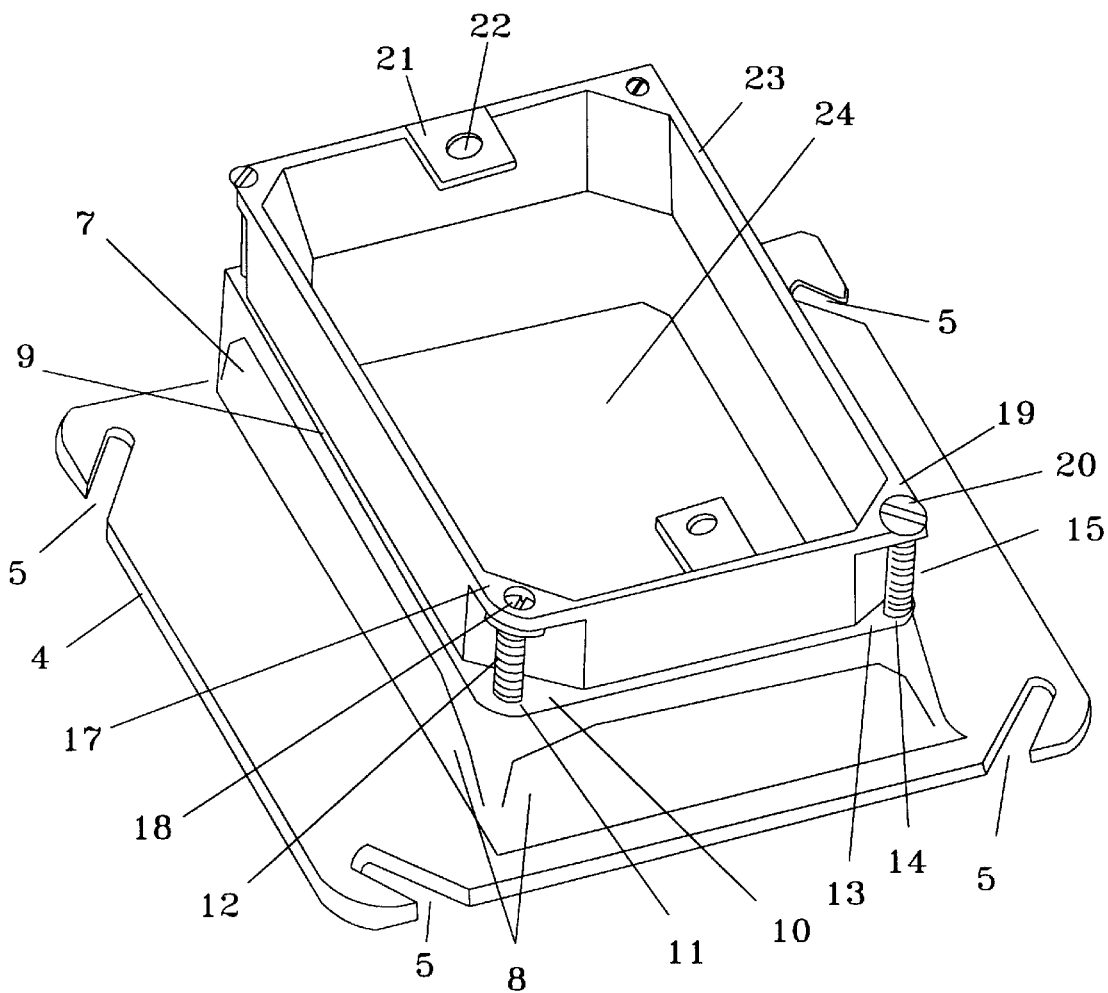
FIG. 1 is a perspective view of an adjustable mudring attachment made in accordance with the principles of the present invention with frame designed to fit inside the collar.
Figure 2:
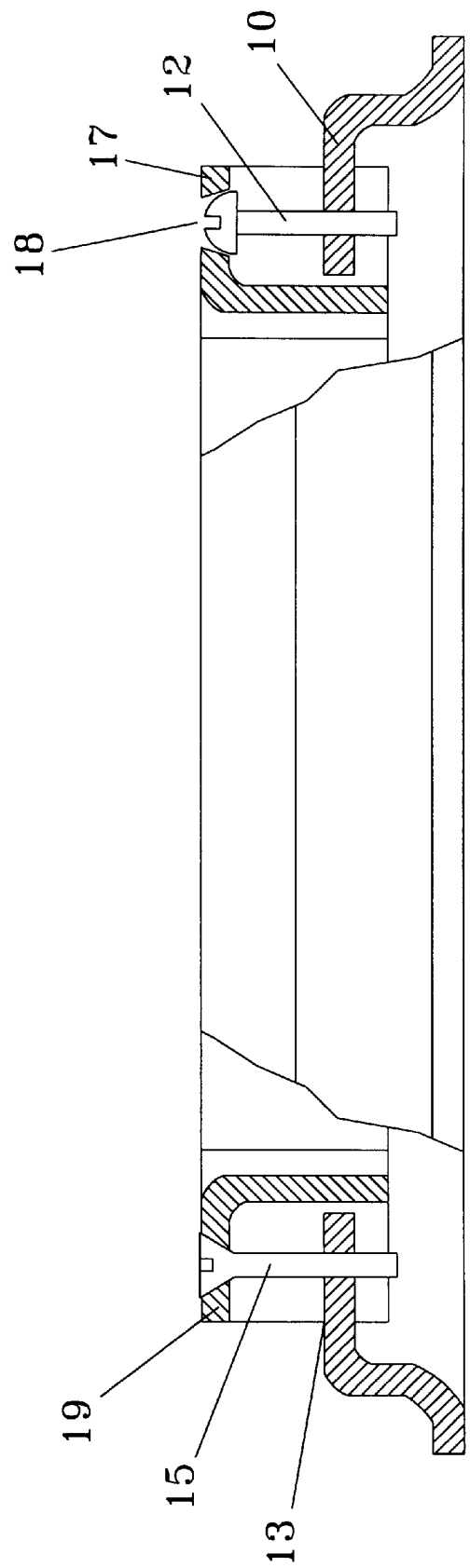
FIG. 2 is a side, elevation, partially cut-away view of the mudring attachment of FIG. 1
Figure 3:
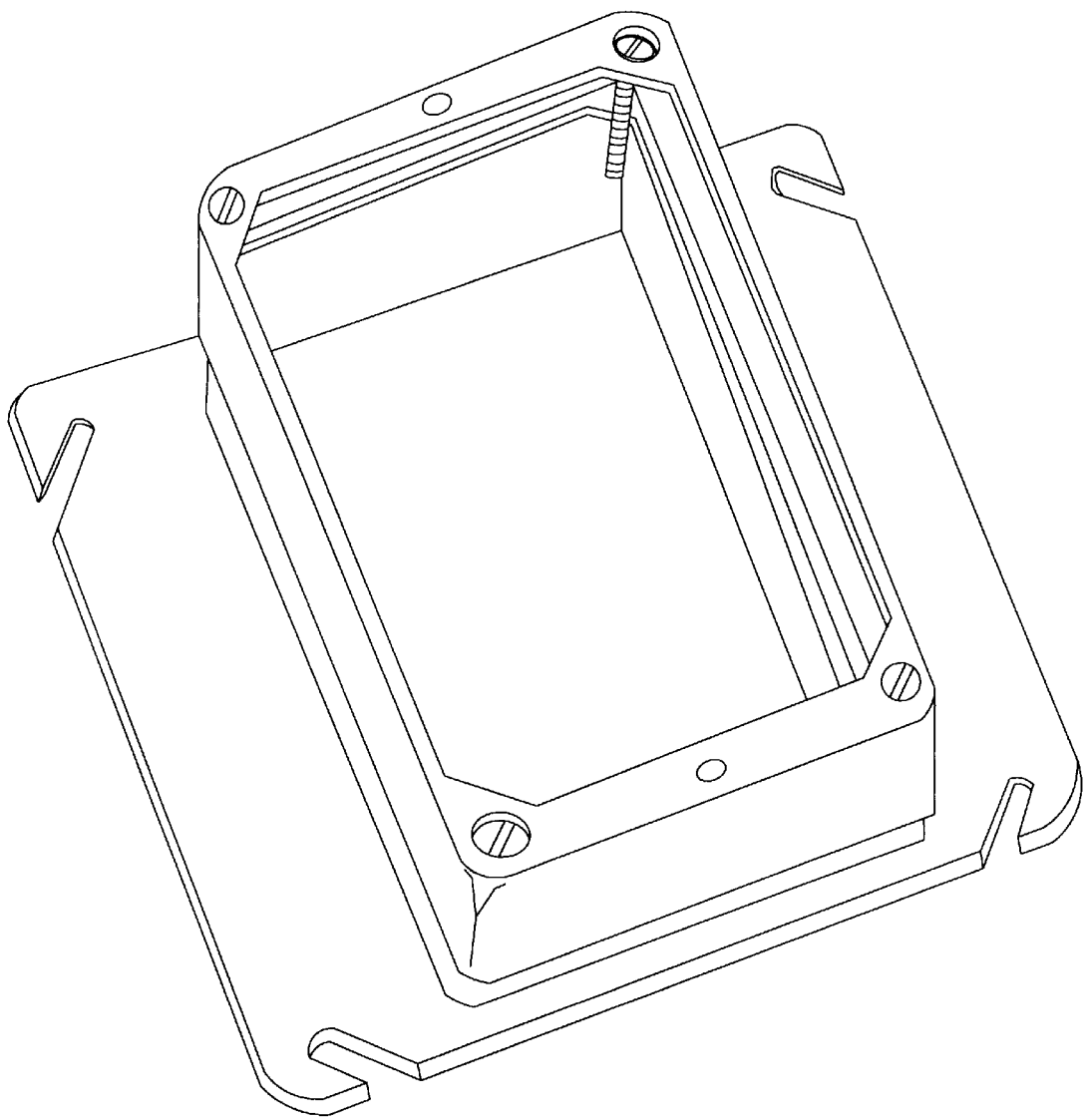
FIG. 3 is a perspective view of an adjustable mudring attachment made in accordance with the principles of the present invention with collar designed to fit inside the frame.
Figure 4:
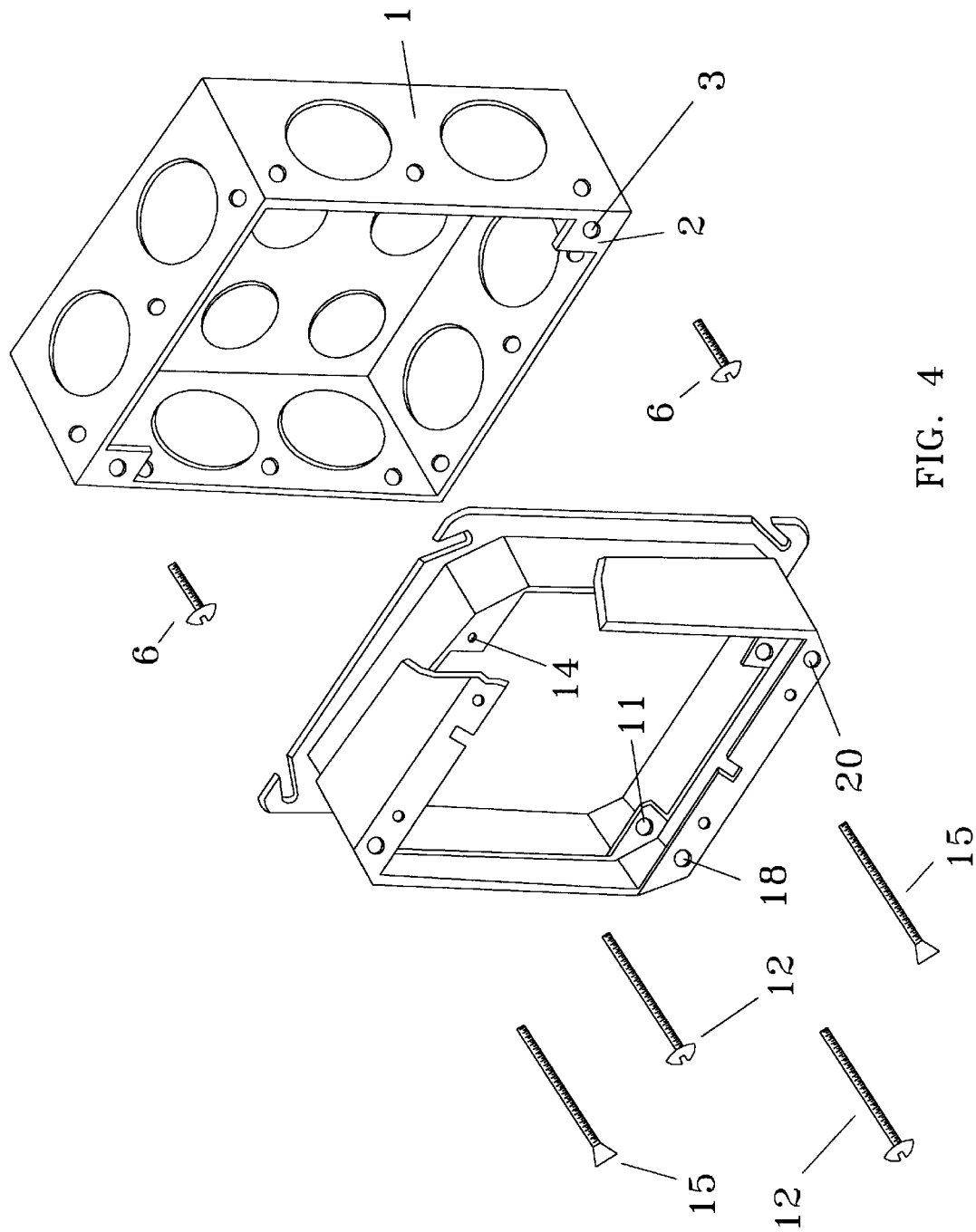
FIG. 4 is an exploded, perspective, partially cut-away view of a conventional electrical junction box and adjustable mudring attachment for accommodating multiple plugs or switches.

Shown in FIGS. 1 and 2 is one embodiment of an adjustable mudring attachment assembly made in accordance with present invention. The assembly includes a generally rectangular mounting plate 4 for use in attaching the assembly to a conventional electrical junction box used in electrical wiring systems. The shape and outside dimensions of the base are the same as the shape and outside dimensions of the base of conventional non adjustable mudring. Slots 5 are formed, spaced about the central opening of the mounting plate 4 for receiving a fastening element 6 (shown on FIG. 4), to enable attaching the base to corresponding treaded openings in electrical junction box 1 (FIG. 4). The slots are formed generally the same way as the slots on conventional non adjustable mudring. There are several different patterns of slots formed on the base of conventional non adjustable mudring and all of them can be used to form slots on the base of adjustable mudring. But discussing the different options is not an object of this invention. Basically the slots have to be so made that to allow for some variance between junction boxes as to the placement of the corresponding treaded openings in the junction boxes. A large central opening 24 is formed in the middle of the mounting plate 4 to allow access through the base into the interior of the electrical junction box.

A generally rectangular collar 7 (can be round ore other) is fixed on the mounting plate 4 about the central opening 23. The collar is open at both sides. The sidewalls 8 of the collar 7 are projecting outwardly from the mounting plate 4 some predetermined distance to define a front lip 9. The depth of the collar 7 may be selected so as to accommodate the needs of the user as will be discussed more fully later. A platforms 10 and 13 are formed at each corner of the collar 7. Platforms 10 are formed on one of the diagonals of the collar respectively platforms 13 are formed on the other diagonal. A threaded openings 11 are formed on each platform 10 to receive the adjusting screws 12 and a threaded openings 14 are formed on each platform 13 to receive the adjusting screws 15.

A generally rectangular frame 16 is slidably mounted within the collar 7. The sidewalls of the frame 16 are generally parallel with the walls of the collar 7. A ears 17 and 19 are formed at each corner of the frame 16 to support the adjustment screws 12 from above and adjustment screws 15 from below. A openings 18 ere maid on ears 17 (placed on one of the diagonals) to allow a screwdriver to go through the ears 17 in order to rich the adjustment screws 12 under the ears 17. A openings 20 are maid on ears 19 (placed on the other diagonal) to allow the adjustment screws 15 to go through the ears 19. The frame 16 is dimensioned as to allow the mounting therein of conventional electrical switches, electrical wall plugs and the like. A pair of tabs 21 extend inwardly from opposite front edges of the frame 16. A threaded openings 22 are formed on each tab arranged to allow the mounting of electrical switches or plugs. The height of the frame 16 (dimension B) is substantially the same as the height of the collar 7 (dimension A) so that the frame 16 can be completely positioned within the collar 7.

The frame 16 is movable forwardly and rearwardly of the collar 7 by appropriate adjustment of the screws 12 and 15 which are positioned in the corners of the frame 16. The screws 12 are inserted into threaded openings 11 formed in platforms 10 and support the ears 17 of the frame 16 from below. The openings 18 are made so that to allow the top of the head of screws 12 to fit into the ears 17. This is to allow the frame 16 to fit deeper into the collar 7 in the most recessed position. The screws 15 are going through the openings 20 formed in the ears 19, are inserted into the threaded openings 14 formed in platform 13 and hold the ears 19 from above. The openings 20 are made so that the heads of the screws 15 are recessed into the ears 19 (the screws 15 are with cone heads). That way the heads of screws 15 do not project out from the edge 23.

When the screws 15 are rotated outward from the collar the support of the ears 19 is released and by rotating the screws 12 outward the frame 16 is moved out from the collar 7. The distance between lip 9 and edge 23 is increased. When the ears 19 come to a contact with the heads of the screws 15 the further movement of the frame 16 is stopped. If the screws 12 are turned outward further the frame 16 is tightened to the collar 7.

When the screws 12 are rotated inward into the collar the support of the ears 17 is released and by rotating the screws 15 inward the frame 16 is moved inward into the collar 7. The distance between lip 9 and edge 23 is decreased. When the ears 17 come to a contact with the heads of the screws 12 the further movement of the frame 16 is stopped. If the screws 15 are turned inward further the frame 16 is tightened to the collar 7 (or if the screws 12 are turned outward the frame 16 is tightened to the collar 7).

By rotating the one of the screws 12 inward and the other screw 12 outward the frame 16 can be tilted toward the one of the corners rotating around the one of the diagonals. Same effect can be reached by rotating one of the screws 15 outward and then the other screw 15 inward the frame 16 can be tilted around the other diagonal.

By rotating the screw 12 at one of the sides of the frame (left side for example) inward and by rotating screw 15 at the same side of the frame inward the frame 16 can be tilted to the left. By working with the other two screws the same way the frame 16 can be tilted to the right.

More, the frame 16 can be tilted to the side and to the corner at the same time and then by tightening the appropriate screws can be secured in that position insuring permanent electrical ground.

Secured frame is very stable and can resist to very violent treatment.

It is not necessary to predetermine the size of the adjustable mudring attachment as for the U.S. Pat. No. 4,634,015.

If the adjustable mudring which is already installed in the wall is to short or to long it can be easy replaced by removing screws 15, removing the frame 16, removing screws 12, replacing screws 12 with longer (shorter) ones, replacing the frame 16 with longer (shorter) one, replacing the screws 15 with longer (shorter) ones and adjusting the adjustable mudring in new position. All that can be done without disturbing the finish of the wall cutting the plaster or removing the cabinets.

Shown in FIG. 4 is an alternative embodiment of the adjustable mudring attachment of the present invention. The embodiment of FIG. 4 is for use when it is desired to install multiple electrical switches or plugs in the same outlet box.

Shown in FIG.4 is a conventional electrical junction box 1 having a pair of tabs 2 positioned in diagonally opposite corners and including threaded openings 3. The screws 6 are inserted in the threaded openings 3 and are used to secure the adjustable mudring assembly to the conventional junction box 1.

It is to be understood that the above described arrangements are only illustrative of the application of the principles of the present invention Numerous modifications and alterations may be devised.

I claim:

1. An adjustable mudring for mounting on conventional electrical junction boxes comprising:

a mounting plate having a large central opening and a smaller openings spaced about the central opening and adapted to receive fastening elements, said smaller openings being positioned to coincide with the threaded openings disposed about the perimeter of a conventional electrical junction box so that the mounting plate may be mounted on such conventional electrical junction box, collar means open at the front and at the back and disposed on the mounting plate about the central opening, said collar means including side walls and platforms with treaded openings to receive adjustment screws, frame means having sidewalls and ears, with openings for the adjustment screws, which are overlapping the platforms of the collar and, at least four screw means mounted on the platforms of the collar means.

2. An adjustable mudring attachment as in claim 1 wherein said mounting plate is substantially rectangular and wherein said smaller openings are slots formed in the edges of the mounting plate.

3. An adjustable mudring attachment as in claim 2 wherein adjacent slots are formed to extend at about right angles with respect to one another.

4. An adjustable mudring attachment as in claim 1 wherein said collar means and frame means are generally rectangular and wherein four screw means are provided, one in each corner.

5. An adjustable mudring attachment as in claim 4 further including a pair of tabs extending inwardly from opposite front edges of the frame means, each including treaded openings and spaced to allow mounting thereon of a conventional electrical switch or plug.

* * * * *